United States Patent Office 2,922,820
Patented Jan. 26, 1960

2,922,820

PREPARATION OF PENTACHLOROTHIOPHENOL

Albert L. Rocklin, Walnut Creek, Calif., assignor to The Dow Chemical Company, Midland, Mich., a corporation of Delaware No Drawing. Application August 29, 1957
Serial No. 680,916

10 Claims. (Cl. 260—609)

The present invention contributes to the organic chemical arts, having particular reference to the preparation of pentachlorothiophenol from hexachlorobenzene.

The chief aim and primary design of the present invention is to provide a greatly improved procedure for converting hexachlorobenzene to pentachlorothiophenol wherein many of the difficulties and deficiencies inherent in heretofore known techniques may be obviated and the desired product obtained as a quality manufacture in a most efficacious and proficuous manner. Other of the objectives, benefits and advantages of the invention will be manifest in the ensuing description and specification.

Concisely and essentially, practice in accord with the present invention involves converting hexachlorobenzene to pentachlorothiophenol by treating the starting material with hydrogen sulfide while it is dissolved or dispersed in a solvent medium or vehicle that consists of a mixture of a tertiary, lower alkyl amine and an N-heterocyclic aromatic tertiary amine, advantageously a pyridic solvent, having at least one open position (i.e., unsubstituted and unsatisfied with other than hydrogen) next to at least one of the cyclic or ring-included functional aromatic nitrogen atoms in its molecule. Remarkable as it may seem, the herein contemplated procedure possibilitates much greater expediency in the performance of the indicated reaction than when it is conducted using either of the indicated varieties of solvents as the sole reaction vehicle. To afford illustration, the reaction rates are very much greater than are those experienced when an unmixed tertiary amine of either type is employed as the solvent vehicle. Furthermore, the composite amine solvent vehicle used in the present procedure permits the desired preparation to be accomplished without formation of salt residues in the reaction mass, as is the case when alkali metal sulphide reagents are used for the conversion.

In order to furnish specific but merely docent and non-limiting delineation of the invention, the following examples are given, wherein, unless otherwise indicated, all parts and precentages are to be taken by weight.

*Example A*

About 10.0 grams of hexachlorobenzene was dissolved in a solvent admixture of 50 milliliters of pyridine and 15 milliliters of triethylamine. Hydrogen sulphide gas was sparged through this solution at a rate of about 60 cubic centimeters per minute for a period of about two and one-half hours while the reaction mass was being maintained at a temperature of about 95° C. A clear, dark solution resulted. After the reaction had been terminated, the reaction mass was diluted with about 200 milliliters of water and sufficient hydrochloric acid added thereto to neutralize the excess mixed amine solvent and to decompose the pentachlorothiophenol amine salt that had formed therein. The mixture of insoluble product and unreacted hexachlorobenzene was removed from the diluted and acidified reaction mass by filtration, after which it was washed with water. Following this it was leached with about 25 milliliters of a 2 percent aqueous sodium hydroxide solution. The unreacted hexachlorobenzene was then removed by filtration. The leach liquor was acidified with hydrochloric acid to reprecipitate the insoluble pentachlorothiophenol. The precipitated product, after being filtered off, was then washed with water and dried under vacuum. About 3.2 grams of substantially pure pentachlorothiophenol, representing a 32 percent conversion of the starting hexachlorobenzene, was obtained. The product was found to melt between about 230 and 240° C. and was demonstrated by infrared analysis to be uncontaminated with pentachlorophenol.

*Example B*

A reaction charge was prepared by mixing about 0.25 gram of hexachlorobenzene with about 1.2 milliliters of reaction vehicle prepared by saturating a mixture of about 10 milliliters of pyridine and 3 milliliters of triethylamine with hydrogen sulphide at 0° C. The resulting mixture was heated for about ten minutes at 120° C. A 50 percent conversion to pentachlorothiophenol product was thereby realized.

In contrast, when the foregoing procedure was repeated, excepting to omit the pyridine and to employ as the reaction vehicle only triethylamine which had been saturated with hydrogen sulphide, the conversion of hexachlorobenzene to desired product was found to be negligible. When pyridine saturated with hydrogen sulphide was utilized as the sole vehicle, no perceptible conversion of the starting material was accomplished.

*Example C*

Hydrogen sulphide was passed for about three and one-half hours through a solution at 120° C. of about 10 grams of hexachlorobenzene in 80 milliliters of pyridine containing about 20 milliliters of tributylamine. About 1.2 grams of substantially pure pentachlorothiophenol product was obtained from the reaction mass following the recovery procedure of the first example.

By way of contrast, when hydrogen sulphide was passed through a solution of 10 grams of hexachlorobenzene in 100 milliliters of tributylamine at 120° C. for the same period of time, only a trace of the desired product (less than 0.025 gram) was found to have been formed.

*Example D*

When about 0.3 gram of hexachlorobenzene was heated in a closed vessel at 120° C. for one hour with a mixture of crystals (presumed to be an amine-hydrogen sulphide salt) and liquid obtained by passing hydrogen sulphide to saturation at 0° C. through a solvent mixture of about 3 milliliters of trimethylamine and 10 milliliters of pyridine, there was found to have occurred about a 25 percent conversion of the starting material to pentachlorothiophenol.

*Example E*

The procedure of Example B was duplicated excepting that quinoline was substituted for the pyridine and that the reaction was conducted for a one hour period. About 30 percent of the starting hexachlorobenzene was converted to pentachlorothiophenol. About 65 percent of the starting material was recovered in an unreacted condition.

*Example F*

The procedure of Example B was duplicated excepting to substitute N,N-dimethylaniline for the triethylamine. No reaction was detected and no conversion of the starting material could be observed. Inoperability is also the consequence of substituting other aryl amines in the solvent vehicle.

Example G

When the general procedure of Example B is duplicated excepting to substitute 2,6-lutidine for the pyridine as the medium for the reaction, only a trace of the desired product is formed.

Excellent results analogous to those obtained in the foregoing illustration can be obtained when other tertiary, lower alkyl amines that are miscible with or soluble in the N-heterocyclic aromatic tertiary amine constituent of the composite amine solvent vehicle are employed for preparation of the solvent in place of or in combination with those illustrated (including, in particular, tertiary alkyl amines having alkyl substituents containing up to 8 carbon atoms, advantageously up to 5 carbon atoms, and those with mixed alkyl substituents); and when other N-heterocyclic aromatic tertiary amine constituents of the indicated variety are used to constitute the solvent. Advantageously, as has been indicated, the N-heterocyclic amine may be a pyridic solvent, open in either or both the 2- and 6-positions of the ring, of the general structure:

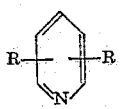

wherein either R is hydrogen or an aliphatic hydrocarbon radical containing from 1 to 4 carbon atoms. The several picolines and certain of the lutidines (i.e., those not simultaneously blocked in the 2- and 6-positions) are illustrative of other pyridic solvents which may be employed with great benefit. If desired, however, as has been indicated in the foregoing, the N-heterocyclic aromatic tertiary amine may be one having a bicyclic structure and may even comprise a plurality of functional nitrogen atoms in the molecular structure. Such higher N-heterocyclic amines are typified by the following compounds and their ring substituted derivatives (not depicted) analogous to those shown in connection with the pyridic solvents:

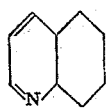  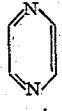

(quinoline)     (quinoxaline)     (pyrazine)

N-heterocyclic aromatic tertiary amine constituents comprised of those having as many as about 20 skeletal atoms of carbon and nitrogen in their molecular structures (including the heterocyclic nitrogen atom or atoms and the atoms in the substituent groups that may be present) may be suitably utilized. Beneficially, the N-heterocyclic amine constituent is comprised of those having a total of up to about 10 skeletal atoms of carbon and nitrogen in their molecules.

As peculiar as it may seem, the use of an N-heterocyclic amine solvent in which both positions next to the functional nitrogen atom are blocked, as in 2,6-dimethylpyridine, tends, pursuant to the foregoing illustration, not to cause or achieve desirable results and seems to render the composite amine solvent medium in which it is incorporated non-conducive to the desired reaction.

Generally, when conducting the present procedure, at least two moles of the alkyl amine are preferably employed in the composite amine solvent per mole of starting hexachlorobenzene being converted. It is usually not advantageous for the mole ratio of alkyl amine to hexachlorobenzene to exceed about 5:1, respectively. Of course, greater relative quantities of the starting material can be incorporated and present in the reaction mass if it is suitable to practice the invention with realization of lower conversions. The composite amine solvent medium may beneficially be comprised of between about 2 and 10 moles of the N-heterocyclic amine per mole of alkyl amine present therein, although greater or lesser quantities can also be utilized, if so desired. As a matter of fact, the mole percentage of the alkyl amine may be as low as about one percent without causing dissatisfactory results in practice of the invention. In most cases, optimum results are obtainable when about 4 moles of the N-heterocyclic amine are used per mole of the alkyl amine in the composite solvent vehicle that is utilized. In this connection, it is generally desirable to use about 0.1 to 0.3 gram of the hexachlorobenzene per milliliter of a pyridic solvent, particularly pyridine, when such a constituent is used in the composite solvent vehicle that is employed. As is apparent from the foregoing, the hexachlorobenzene starting material may not always dissolve completely in the composite solvent vehicle that may be used. In some instances the starting material may be partly dissolved and partly dispersed in the solvent.

In the reaction, at least one mole of hydrogen sulphide is employed for each mole of the hexachlorobenzene to be converted in order to form the mercapto group on the substituted benzene in the presence of the composite amine solvent vehicle. Quantities of hydrogen sulphide in excess of stoichiometric requirements may often be employed to increase the efficiency of the hexachlorobenzene conversion. Usually, the hydrogen sulphide may conveniently be passed directly into the solution of the hexachlorobenzene in the composite amine solvent in order to accomplish the reaction. As is apparent from the foregoing, however, the hydrogen sulphide may be provided by saturation of the solvent medium therewith prior to introduction of the hexachlorobenzene to be converted.

The reaction may be conducted under either atmospheric or superatmospheric pressures, depending on the boiling point characteristics of the solvent vehicle and its capacity for dissolving hydrogen sulphide. Frequently, the procedure may be satisfactorily accomplished under atmospheric pressure since hydrogen sulphide is sufficiently soluble in many of the composite amine vehicles to react readily with the dissolved hexachlorobenzene. Sometimes, however, the reaction may be facilitated by conducting it under greater than atmospheric pressure. This may secure advantage when a composite amine vehicle is employed which may not dissolve enough hydrogen sulphide at the reaction temperature and under atmospheric pressure to accommodate the reaction. It may also be beneficial to resort to superatmospheric pressures for the reaction when lower boiling composite amine solvent vehicles are employed in order that the attainment of a suitable reaction temperature may be facilitated.

According to the present procedure, the reaction may be conducted at temperatures between about 75 and 150° C., advantageously at temperatures in excess of about 90° C. Very little conversion is found to occur as an ordinary rule at temperatures beneath the indicated range. At temperatures above 150° C. there is the possibility of causing undesirable reactions and unwanted products to form. Preferably the reaction temperature is at the boiling point of the reaction mass when it equals or exceeds about 90° C. under any particular pressure selected for accomplishment of the desired preparation. When pyridine is used in the preferred proportions in the composite amine solvent along with alkyl amines having substituent groups that each contain 4 carbon atoms or less, a reaction temperature of about 110–130° C. is usually desirable and the reaction, as has been indicated, may frequently be conducted under atmospheric pressure. Ordinarily, excellent conversions and yields may be realized within a few minutes. On certain occasions, however, it may be desirable to employ somewhat longer periods of time for the reaction. By way of illustration of this, in the cases where hydrogen sulphide is difficultly soluble in the composite solvent vehicle and low reaction temperatures are utilized or where other conditions that may be disadvantageous to and non-conducive of the reaction are encountered, it may be beneficial for reaction periods of as long as about four hours to be resorted to. When the reaction has been completed, the dissolved pentachlorothiophenol may be recovered in the manner that has been illustrated in the foregoing. Usually, it is not necessary to acidify the whole of the reaction mass in order to facilitate the recovery of the product. If so desired, excessive quantities of the solvent can be stripped from the reaction mass prior to the acidification thereof. As is apparent, other suitable recovery methods may also be invoked for separating the product, as will readily occur to those possessed of the skill of their calling.

The pentachlorothiophenol product that is prepared by the practice of the present invention is generally a crystalline, colorless compound having very little odor. While it is insoluble in water and soluble to only a limited extent in ethanol, it dissolves in chloroform and in hot aromatic solvents. The desired product is directly obtained consistently and at rapid rates by the herein-contemplated procedure using a relatively inexpensive source of reactive sulfur. The pentachlorothiophenol may invariably be prepared in good yield with sufficient purity for most purposes to preclude further requirements for purification, especially when it is intended for such conventional applications as the plastification of natural and synthetic rubbers and other elastomeric polymers.

What is claimed is:

1. Procedure for converting hexachlorobenzene to pentachlorothiophenol which comprises forming a reaction system by mixing about one molar quantity of hexachlorobenzene to be converted to pentachlorothiophenol with a composite amine solvent vehicle consisting of (1) at least two moles of a tertiary lower alkyl amine having substituent alkyl groups that contain not more than 8 carbon atoms and (2) from about 1 to 100 moles per mole of said alkyl amine of an N-heterocyclic tertiary amine that is aromatic and has in its structure from one to two heterocyclic nitrogen atoms in a ring configuration selected from the group consisting of (a) six-membered carbon and nitrogen monocyclic nuclei and (b) ten-membered carbon and nitrogen bicyclic nuclei and which contains not more than 20 skeletal atoms of carbon and nitrogen in its entire molecular structure, said aromatic tertiary N-heterocyclic amine having at least one open position next to at least one of the functional aromatic nitrogen atoms in the cyclic structure; and subjecting said hexachlorobenzene while it is in said system at a temperature between about 75 and 150° C. to at least a stoichiometric quantity of hydrogen sulphide that is present in said system until at least a portion of said hexachlorobenzene is converted to pentachlorothiophenol.

2. The improvement in the art that is recited in claim 1, wherein about 4 moles of said N-heterocyclic amine are present in said composite amine solvent vehicle per mole of said alkyl amine therein.

3. The improvement in the art that is recited in claim 1, wherein said tertiary lower alkyl amine has substitutent alkyl groups that contain from 1 to 5 carbon atoms.

4. The improvement in the art that is recited in claim 1, wherein said N-heterocyclic aromatic tertiary amine is quinoline.

5. The improvement in the art that is recited in claim 1, wherein said N-heterocyclic aromatic tertiary amine is a pyridic solvent.

6. The improvement in the art that is recited in claim 1, wherein said N-heterocyclic aromatic tertiary amine is pyridine.

7. The improvement in the art that is recited in claim 1, wherein said composite amine solvent vehicle consists of a tertiary lower alkyl amine having substituent alkyl groups that contain from 1 to 5 carbon atoms and about 4 moles of a pyridic solvent and wherein from about 0.1 to 0.3 gram of said hexachlorobenzene are present in said composite amine solvent vehicle per milliliter of pyridic solvent therein.

8. A procedure according to that described in claim 7, wherein said pyridic solvent is pyridine.

9. A procedure according to that described in claim 7, when it is conducted at a temperature of from about 90 to 130° C.

10. The improvement in the art that is recited in claim 1, wherein said hexachlorobenzene is subjected while it is mixed in said system to said hydrogen sulphide by passing said hydrogen sulphide through said mixture of hexachlorobenzene with said composite amine solvent vehicle therefor.

References Cited in the file of this patent

UNITED STATES PATENTS

| | | |
|---|---|---|
| 1,825,662 | Hale | Oct. 6, 1931 |
| 2,591,776 | Borrows | Apr. 8, 1952 |
| 2,695,898 | Lober et al. | Nov. 30, 1954 |

OTHER REFERENCES

MacArdle: Use of Solvents in Organic Chemistry (1925 edition), D. Van Nostrand Co., New York, pp. 3, 7, 38, 39, 105 and 107–112.

Barr et al.: J. Am. Chem. Soc. 72, 4480–4482 (1950).